United States Patent Office 3,412,013
Patented Nov. 19, 1968

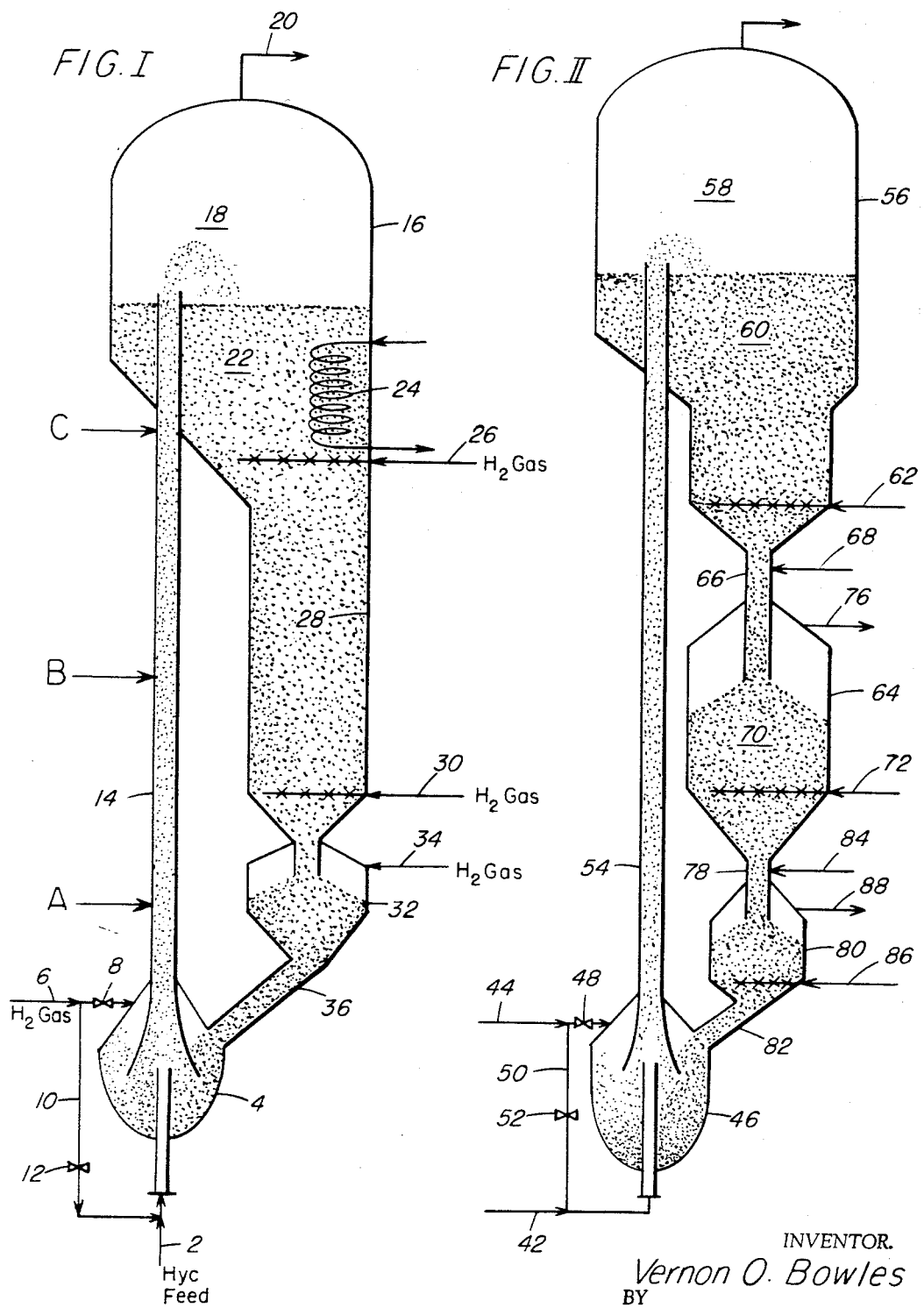

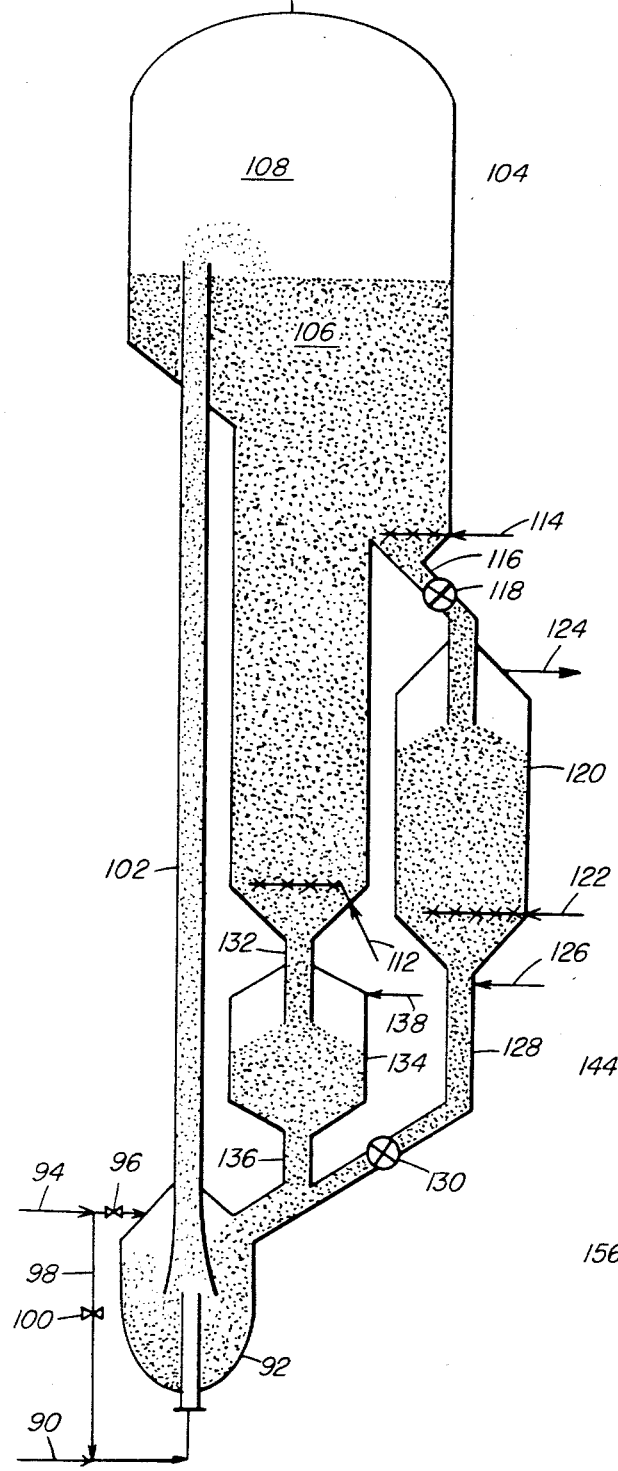
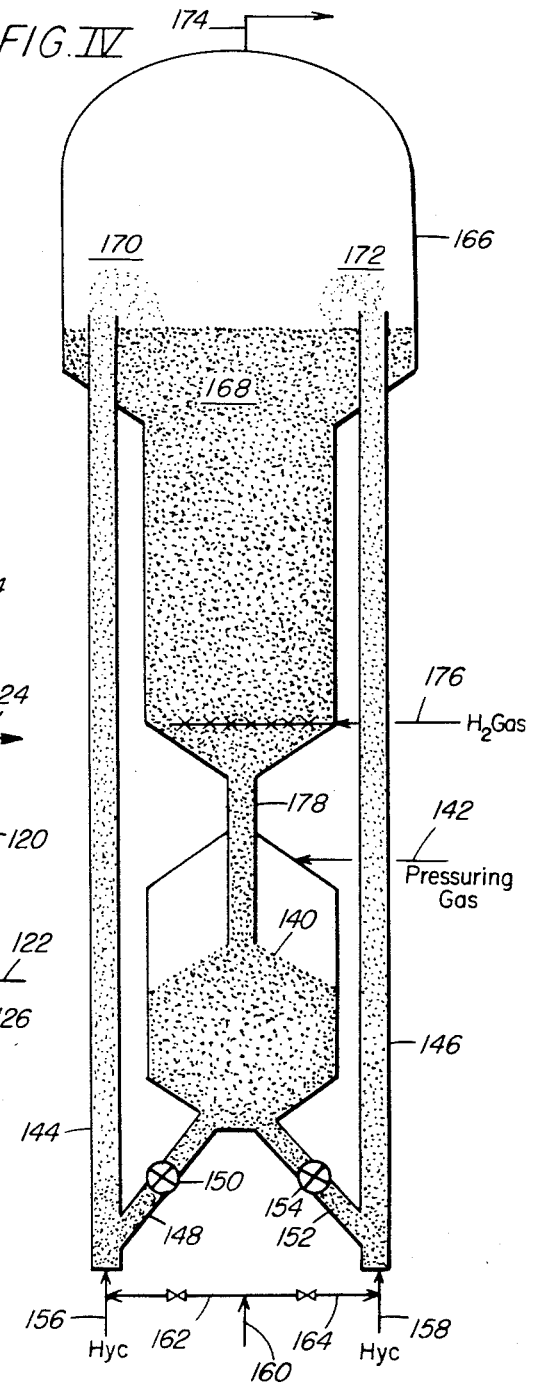

3,412,013
REGENERATING A CRACKING CATALYST BY HYDROGEN AND OXYGEN TREATMENT
Vernon O. Bowles, Bedford, N.Y., assignor to Mobil Oil Corporation, a corporation of New York
Continuation of application Ser. No. 318,694, Oct. 24, 1963. This application Feb. 15, 1967, Ser. No. 616,416.
9 Claims. (Cl. 208—120)

ABSTRACT OF THE DISCLOSURE

This document describes the cracking of hydrocarbons in a riser-cracking zone by contact with a crystalline aluminosilicate-containing catalyst. Deposition of carbonaceous material is limited during the conversion and subsequent hydrogenation can remove such materials from the catalyst without a need for oxidative regeneration of all the catalyst.

---

This application is a continuation of Ser. No. 318,694 filed Oct. 24, 1963, now abandoned.

This invention relates to the catalytic conversion of hydrocarbons. In a more particular aspect, the invention relates to the method and means for catalytically cracking hydrocarbons in the presence of superactive cracking catalysts and at space velocities which permit contact times amounting to a fraction of a second. In another aspect, the invention relates to the method and system for regenerating cracking catalysts having an activity substantially above amorphous silica-alumina catalyst employed in the cracking of hydrocarbons.

In prior art catalytic conversion processes, a powdered or granular catalytic material is caused to circulate through a reaction zone and a regeneration zone wherein the catalytic material is contacted with gasiform material at space velocities generally exceeding 1 v./v./hour in order to provide contact times within the respective contact zones exceeding 4 or 5 seconds and preferably contact times up to 10 or 15 seconds. Numerous variations for circulating catalyst between one or more hydrocarbon conversion zones and/or regeneration zones to provide a suitable heat balance cyclic system have been proposed and these systems have been generally satisfactory for the catalytic material available for use therein. However, the continued search to improve the cracking operation and reduce the overall economies thereof, has led to the development of new superactive catalysts comprising an orderly crystalline lattice structure of silica and alumina which may not be employed in present prior art systems to fullest advantage.

An object of this invention is to provide an improved method and means for converting hydrocarbon in the presence of high activity catalytic material and regeneration of the catalytic material for reuse in the hydrocarbon conversion step.

Another object of this invention is to provide a cyclic process for handling superactive catalytic material in effecting the catalytic cracking of hydrocarbon feed materials.

A further object of this invention is to provide an improved method and combination of process steps for regenerating high activity catalytic cracking catalysts employed in the conversion of hydrocarbon feed material.

Other objects and advantages of this invention will become more apparent from the following description.

The present invention relates to the method and sequence of process steps for utilizing catalysts of superactivity and comprising crystalline aluminosilicates of orderly lattice structures for effecting short contact time catalytic cracking of hydrocarbon feed materials, such as gas oils, topped crudes, residual oils and other high boiling hydrocarbon fractions known as reduced crudes or combinations of these materials. More specifically, the present invention relates to a catalytic cracking-regeneration process wherein a hydrocarbon feed material is passed in contact with a superactive catalyst such as that derived by activation of aluminosilicate first in a relatively limited catalyst phase cracking zone at a space velocity sufficient to provide an initial desired contact time. Although the contact time may be varied considerably to effect the desired conversion, generally not more than a fraction of a second is required with the superactive catalysts herein described to obtain at least partial and generally substantial conversion of the hydrocarbon feed. Substantially, immediately after separating a major portion of the hydrocarbon conversion product from the catalyst, the catalyst is contacted in a hydrogen atmosphere and under conditions of severity which will result in removal of adsorbed hydrocarbonaceous material remaining with the catalyst and deposited thereon during the catalytic cracking step. Accordingly, by the method and sequence of process steps of this invention, hydrocarbonaceous material introduced to the process is initially contacted with catalyst in a catalytic cracking atmosphere after which the catalyst is exposed to a hydrogenating atmosphere which may be parallel to or prior to an oxidizing atmosphere so that all or at least a portion of the catalyst may be subjected to hydrogenating and/or oxidizing treatment prior to returning the catalyst directly to the limited phase cracking step. The hydrogenating atmosphere and conditions to which the catalyst is subjected is of a severity sufficient to cause removal of substantial portions of the hydrocarbonaceous material deposited on and entrained with the catalyst. Under some conditions, the hydrogenating treatment is sufficient to permit returning the thus treated catalyst directly to the limited phase cracking step of the process without further intermediate treatment.

The depth of conversion of the oil during the limited phase cracking step employing the catalysts herein described depends upon a factor known as severity which is a function of space velocity, temperature cat./oil ratio and catalyst activity in any given catalyst system. When employing high activity or superactive catalyst such as those herein described, the time of contact takes on a greater significance than heretofore appreciated. Accordingly, heretofore employed catalytic cracking temperatures in the range of from about 900° F. to about 1000° F. and hydrocarbon-catalyst contact times of the order of several seconds ranging up to about 10 to 15 seconds or more must be considerably altered to accommodate the more sensitive high activity aluminosilicate containing cracking catalyst herein discusssed. One method of controlling the cracking operation to permit using these superactive catalyst, or any catalyst for that matter, resides in controlling the time of contact of the hydrocarbon reactant with the catalyst in conjunction with the reaction temperature employed.

In the method of this invention, it is desired among other things, to control the conversion of the hydrocarbon feed in the limited phase reaction step so that high boiling materials or unconverted residual constituents of the hydrocarbon feed adsorbed on and/or entrained with the catalyst may be treated with hydrogen-rich gases under hydrogenating conditions sufficient to cause at least partial regeneration of the catalyst with resultant removal of said high boiling or unconverted constituents through hydrogenative conversion to useful products before they condense into complex materials that require more drastic regeneration treatment. When employing relatively severe hydrogenating conditions in the presence of, for example, a hydrogenating metal component deposited thereon or mechanically mixed therewith, the hydrogenating step will permit recycling at least a portion of the catalyst thus treated directly to the initial limited phase catalytic cracking step.

In a more particular aspect, the catalyst employed in the method of this invention is caused to flow through a first limited phase cracking step under conditions to obtain at least partial conversion of the hydrocarbon feed material and thereafter as a relatively dense agitated bed of solids through a conversion zone for hydrogenative treatment of high boiling reaction products and unconverted hydrocarbon feed material entrained with the catalyst. The hydrogenative treating step of this invention is maintained under conditions which will accomplish at least partial hydrogen regeneration of the catalyst and under some conditions of operation this hydrogen regeneration will be sufficient to permit recycle of the catalyst directly to the catalytic cracking or conversion step. It is contemplated in an embodiment of this invention of employing one or more limited phase catalytic cracking steps in association with the hydrogen-regeneration step. Of course, the hydrogen-regeneration step need not be limited to a dense fluid bed but may be also effected in a dilute phase operation either concurrent or countercurrent to the regeneration gas. In the method and sequence of process steps of this invention, the hydrogenation-regeneration step may also be considered as a stripping step in conjunction with a hydrogen-regeneration step which are completely compatible with the adjacent catalytic cracking step and products thereof to permit the products of each to be recovered either separately or as a combined stream. Thereafter, the catalyst, depending on the level or amount of carbonaceous contaminant remaining thereon, is recycled to the limited phase cracking step of the process either with or without further treatment of all or a portion of the catalyst in an additional regeneration treatment comprising an oxidizing atmosphere to remove undesired more tenacious carbonaceous material remaining on the catalyst. That is, it is contemplated in an embodiment of this invention that only a small portion of the catalyst withdrawn from a hydrogenative step would be passed to a separate and generally more severe regeneration step under conditions to effect partial or substantially complete removal of more tenacious carbonaceous material remaining on the catalyst that tends to reduce the catalyst activity level thereof below a desired limit. This additional regeneration step may be an oxygen regeneration step to remove the carbonaceous material by burning or a high severity, high pressure hydrogen-regeneration step may be employed as an embodiment thereto. Generally, it is preferred to employ oxygen regeneration of a portion of the catalyst since this may be accomplished at relatively low pressure conditions, and in an arrangement of steps so that all or a small portion of the circulating catalyst may be subjected to the oxygen regeneration treatment prior to returning this catalyst to the cracking step. When treating only a small portion or slip stream of the circulating catalyst in this manner, the oxidation treatment may be effected either as an intermittent or continuous oxygen regeneration step depending upon the need. Generally, the oxygen regeneration step will follow the hydrogen-regeneration step so that all or a portion of the hydrogen treated catalyst may then be subjected to oxygen treatment before returning the catalyst to the dilute phase cracking step. It is contemplated in another embodiment, however, of providing the oxygen-regeneration treatment for only a portion of the catalyst in parallel flow arrangement with the hydrogen-regeneration step of the process. This embodiment is particularly desirable for the purpose of increasing the heat supplied by the catalyst to the limited phase cracking step by increasing the amount of carbonaceous material passed to the oxygen-regeneration step. In another embodiment, the catalyst may be subjected to a high pressure hydrogen-regeneration step in place of any oxidation treatment of the catalyst and this latter arrangement is particularly desirable when employing a catalyst which is sensitive to moisture or water vapor at relatively high temperatures approaching combustion temperatures encountered in the oxygen regeneration of carbon contaminated catalyst. As a means for effecting the high pressure hydrogen-regeneration treatment of the catalyst, it is contemplated passing all of the catalyst or a minor portion thereof through, for example, a pressure building lock-hopper system or other suitable arrangement to a high pressure hydrogen-regeneration zone maintained at a pressure in excess of about 500 p.s.i.g. wherein the carbonaceous material is caused to be removed from the catalyst with hydrogen treatment. This step of the process may be enhanced with a hydrogenating metal component. The thus treated catalyst may then be returned to the relatively low pressure catalyst circulating system after depressuring. It is contemplated effecting the high pressure hydrogen-regeneration step as an intermittent operation rather than as a continuous operation.

The systems and arrangement of process steps of this invention may employ the catalyst in substantially any desired particle size range which is suitable for a dilute or dense phase operation. That is, the catalyst particles may be of a size in the range of from about 0 to about 100 microns, preferably from about 20 to about 60 or 80 microns or larger sized particles up to about ⅛″ or even ¼″ particle sizes may be employed; the only restriction being that the catalyst particles are sufficiently uniform in particle size to permit easy handling and of a size which will avoid the tendency to classify in the circulating catalyst system employed except where it is desirable to employ separate physical mixtures as suggested herein. It is also contemplated employing catalyst particles in the range of from about 100 to about 400 mesh size, preferably from about 150 to about 300 mesh size in the system of this invention.

In accordance with the method and system of this invention, a limited phase reaction zone is intended to include a dilute phase reaction zone or a dense phase reaction zone with particular emphasis for each type of system being directed to adjusting the conditions of time of contact, temperature and catalyst to oil ratio to provide a desired conversion of the feed under catalytic cracking conditions to useable products.

In accordance with the method and system of this invention, it is contemplated employing relatively long and/or relatively short limited phase reaction zones which are employed under dilute phase or relatively dense solid phase reaction conditions to accomplish a desired conversion. Furthermore, particular emphasis for each type of system is directed to adjusting the conditions of contact time, temperature and catalyst/oil ratio which will provide a desired conversion of the feed under conditions promoting cracking to desired useable products.

Accordingly, the limited phase reaction zone is a confined reaction zone such as a riser reaction zone of substantially any desired length which will permit contact of a reactant material with solid finely divided catalytic material throughout the total or a portion of the length thereof to obtain a desired contact time therebetween.

Although the limited phase reaction zone is preferably a substantially vertical reaction zone, it may be convenient in some system to use a substantially horizontal or sloped confined reaction zone which is externally adjacent to or positioned within a reaction zone containing a relatively dense bed of solid particle material. In yet another embodiment, it is contemplated incorporating relatively short riser reactors substantially within a dense fluid bed of catalytic particles in a manner which will permit passing the catalyst directly from the bed upwardly through the riser at a desired density with a gaseous material at a desired temperature for discharge from the riser above the bed of catalyst. In this embodiment, the gaseous material may be used to impart heat to the confined reaction zone and the hydrocarbon reactant to be converted may be introduced thereto for passage through the total or a portion of the length of the confined reaction zone depending on the contact time desired.

Although not specifically shown in the figures more fully described hereinafter, it is to be understood that an oil or hydrocarbon reactant inlet pipe of substantially smaller diameter than the confined reactor may extend substantially any distance thereinto as a means for controlling contact time between the catalyst particles and the reactant material. On the other hand, the hydrocarbon reactant may be introduced to the confined reactor or riser reaction zone through spaced inlet pipes as shown and described with respect to FIGURE I.

In accordance with one embodiment of this invention, a high activity cracking catalyst preferably at an elevated temperature is passed upwardly through one or more limited phase reaction zones in admixture with hydrocarbon reactant material either with or without a gaseous diluent at an elevated mix temperature in the range of from about 400° F. to about 1000° F., preferably from about 500° F. to about 925° F., at a velocity in the range of from about 30 to about 150 ft./sec. and preferably from about 40 to about 80 ft./sec. In the limited phase contact step of the process, the hydrocarbon feed is preferably subjected to an initial contact with the catalyst which is generally less than 1.0 second and preferably less than 0.5 second under desired elevated temperature cracking conditions maintained below about 900° F. These conditions are maintained to obtain a conversion of the feed amounting to at least 40% conversion in one embodiment or not substantially above 40% conversion in another embodiment more fully discussed herein and prior to effecting initial separation of the catalyst from the products of the cracking reaction. The catalyst hydrocarbon reactant mixture passing through the limited phase reaction zone is thereafter discharged into a separation zone adjacent to a dense fluid bed of the separated catalyst which is thereafter subjected to a hydrogenative treatment comprising at least hydrogen stripping of hydrocarbonaceous material from the catalyst. The separation zone referred to above may be a part of the dense phase hydrogenation zone or one or more cyclone separation zones which discharge separated catalysts. On the other hand, the initial separation zone may comprise a dilute phase catalyst disengaging space such as often exists, for example, above a relatively dense fluidized bed of catalyst. In any event, the separated catalyst is maintained in an initial contact zone wherein the catalyst entraining a portion of unconverted hydrocarbonaceous material and some converted hydrocarbon product from the limited phase cracking step is subjected to a hydrogen stripping and hydrogen-regeneration treatment at a temperature in the range of from about 800° F. to about 1600° F., preferably from about 1000° F. to about 1400° F. at a pressure equal to and preferably above the pressure maintained in the limited phase cracking zone. It is desirable to maintain a relatively high pressure in the hydrogen-treating step or hydrogen-regeneration step to facilitate removal of hydrocarbonaceous material from the catalyst sufficiently to permit recycle of the catalyst directly to the limited phase cracking zone or zones and this hydrogen-treating step may be accomplished in the presence of an additional catalyst component comprising a hydrogenating metal in the presence of the herein described superactive cracking catalyst. Thereafter the catalyst may be subjected to additional treating steps comprising oxygen regeneration or a high pressure hydrogen-regeneration step hereinbefore discussed.

When employing, for example, a dense phase fluid contact zone immediately following the limited phase cracking step, the hydrocarbonaceous material on the catalyst is subjected to a much longer contact time generally in the range of from about 3 seconds to about 100 seconds or more at elevated temperatures preferably above the limited phase cracking temperatures in the presence of an excess amount of hydrogen. The duration of contact time of this dense phase contact step is dependent on the catalyst flow therethrough, the inventory maintained therein, and the removal of hydrocarbonaceous material desired. Heat may be supplied to the dense fluid bed of catalyst by the hydrogen-rich reactant gas and/or suitable heating means immersed in the bed.

Generally, the oxygen regeneration zone when employed in the method and process of this invention will be relatively small in comparison with that employed in the hydrogen-regeneration step of the process and will be maintained at a pressure equal to, lower or even greater than the dense fluid bed hydrogen-treating step discussed above but higher than the pressure in the limited phase cracking step. Oxygen-regeneration zone pressures lower than said limited phase cracking steps are also desirable under certain conditions. Generally, the pressure of the oxygen-regeneration step will be in the range of from about 5 to about 100 p.s.i.g. while employing regeneration temperatures in the range of from about 1000° F. to about 1400° F. When employing a high pressure hydrogen-regeneration step above about 300 p.s.i.g. in place of an oxygen-regeneration step, effective hydrocracking of residual hydrocarbonaceous material remaining on the catalyst is aided with elevated temperatures above about 900° F. and this may be enhanced by incorporating one or more Group VI and/or Group VIII metal components with the catalyst promoting hydrocracking reactions.

The present process and method of operation is not to be confused with prior art multiple stage cracking processes employing transfer line cracking followed by dense fluid bed cracking of a recycle oil fraction since these prior art processes employ a much longer contact time in the transfer line reactor, they employ substantially less active catalyst, the high boiling recycle feed is thereafter added to a dense fluid bed of the catalyst for further conversion under catalytic cracking conditions over and above that carried out in the transfer line reactor. In addition, these processes employed oxygen regeneration alone for all of the catalyst circulated in the system. These prior art systems also do not employ the high activity catalyst contemplated in the process and system of this invention. Accordingly, the process of this invention differs in part from prior art systems in that the catalyst is employed under catalytic cracking conditions for substantially shorter contact times in the limited phase contact zone to achieve a desired conversion and hydrogenative treatment of the catalyst separated from the limited phase contact zone to recover hydrocarbon materials deposited on and entrained with the catalyst.

As indicated hereinbefore, it is contemplated employing in one embodiment of this invention, more than one limited phase reactor which may be a dilute or dense phase reactor such as an elongated confined reactor. For example, the limited or confined reactor may be a horizontal or vertical reactor through which the catalyst may flow in either direction. Furthermore, a plurality of riser conduits may be employed for contacting a hydrocarbon feed material or fractions thereof with the superactive catalyst herein described. In another example, a fresh feed may be separated into two or more such as a plurality of fractions of different boiling range to permit contact of each fraction under desired and/or optimized cracking conditions in separate limited phase reactors in the form of confined riser reactors of limited length.

Among other things, the present invention relates to effecting catalytic cracking of a hydrocarbon fraction in the presence of a high activity cracking catalyst and under conditions causing the catalyst to become at least partially deactivated with hydrocarbonaceous deposits comprising components derived from the hydrocarbon fraction initially passed in contact with the catalyst and thereafter converting these components with hydrogen-rich gases in a separate zone or zones under conditions causing hydrogenation and/or hydrocracking of these components sufficiently to maintain the catalyst substantially at a desired activity and selectivity for an extended period of operating time.

More specifically, in an embodiment encompassing the above suggested combination of processing steps, the removal of accumulated hydrocarbonaceous material from the catalyst when containing a hydrogenating metal component is carried out using hydrogen as the regenerating gas and under conditions selected to effect hydrogenation, hydrogen transfer and/or cracking of high boiling adsorbed hydrocarbon constituents as desired.

Accordingly, the use of hydrogen to remove hydrocarbonaceous material from the catalyst by $H_2$ regeneration or hydrocracking as well as by stripping is dependent in part upon the characteristics of the hydrocarbonaceous material remaining on the catalyst following the catalytic cracking step and the temperature conditions employed. When the hydrocarbonaceous material is a relatively soft carbonaceous mass as distinguished from a hard coke resembling graphite, lower temperature conditions comprising hydrocracking conditions accompanied by hydrogenating conditions may be employed to remove the soft coke like material. Accordingly, it is contemplated controlling the nature and amount of hydrocarbonaceous deposit on the circulating catalyst by adjusting the conditions in the limited phase reaction zone and the temperature of the hydrogen treating step to prevent dense unreactive deposits resembling graphite from building up on the catalyst above a desired amount. This control of the coke deposit may be facilitated by effecting oxygen regeneration of a portion of the catalyst circulated in the system. Therefore, by adjusting the conversion conditions in the catalytic cracking step to effect desired conversion of the feed and removal of catalyst deposits including residual components of unconverted feed under hydrocracking conditions with the superactive catalyst of this invention, an overall conversion improvement is achieved. Furthermore, hydrogen regeneration of the catalyst at higher temperatures may be alternately effected with the hydrocracking step or simultaneously on a portion of the catalyst circulating in the system.

The catalysts employed in the method and systems of this invention include high activity crystalline aluminosilicate containing cracking catalysts of orderly lattice structure and uniform pore diameter of at least about 6 Angstroms and which have been ion exchanged and/or rare earth exchanged to produce desired active sites. The thus modified catalytically active crystalline aluminosilicates may be used alone or as suggested above, be combined with one or more hydrogenating and/or hydrocracking promoting components. Furthermore, the catalytically active crystalline aluminosilicate either with or without a hydrogenating component, physically combined, deposited on or in the crystalline aluminosilicate may be used alone, mechanically admixed with or composited with synthetic or naturally occurring components, such as clays, hydrous oxide gels, gels of mixed hydrous oxides and the like which may be inert or may themselves possess catalyst activity.

Alkali metal containing aluminosilicates employed in the preparation of the catalysts of this invention are known and frequently referred to as synthetic zeolites. These materials are forms of crystalline hydrous siliceous zeolites containing varying quantities of alkali metal and aluminum with or without other metals. The alkali metal atoms; silicon, aluminum and oxygen in these zeolites are arranged in the form of an aluminosilicate salt in a definite and orderly lattice crystalline pattern. The structure contains a large number of small cavities, interconnected by a number of holes or channels. These orderly cavities and channels are of substantially uniform dimensions, the sizes of which are characteristic of the crystalline form of the particular aluminosilicate. The alkali-metal containing aluminosilicate initially used in the preparation of the superactive catalysts of this invention have a uniform pore structure comprising openings characterized by an effective pore diameter of at least about 6 Angstroms.

One method of preparing catalyst to be employed in the system of this invention comprises ion exchanging a crystalline aluminosilicate, such as for example, the commercially available "13x zeolite" with a solution salt or mixture of salts of a desired metal, or metals such as for example, a mixture of rare earth chlorides, for a sufficient exposure to effect substantial replacement of alkali metal ions. Other methods useful with many crystalline aluminosilicates are ion exchange with ammonium chloride, followed by heating the drive off $NH_3$, leaving an H-form or acid aluminosilicate, or treatment with acid solutions to the same end. The resultant products, washed, dried and calcined to dehydrate, are superactive crystalline aluminosilicates. They may be used alone or they may be used in mixtures or composited with other materials, such as clays, hydrous oxide gels, mixture of hydrous oxide gels, and the like which may be inert, or which may themselves possess catalytic activity. The superactive catalyst comprising aluminosilicate may be associated with other components, such as hydrogenation or dehydrogenation components by admixture, impregnation, and the like.

In a catalyst mixture composed of crystalline aluminosilicate and inorganic oxide gel, the inorganic oxide gel employed may serve as a matrix for the crystalline aluminosilicate material distributed therein. Silica gel alone may be utilized as a suitable matrix. On the other hand, the silica gel may also be a cogel of silica and an oxide of at least one metal selected from the group consisting of metals of Groups II, III, and IV of Mendeleeff's Periodic Table. Such components include, for example, silica-alumina, silica-magnesia, silica-zirconia, silica-thoria, silica-beryllia, silica-titania as well as ternary combinations, such as silica-alumina-thoria, silica-alumina-zirconia, silica-alumina-magnesia and silica-magnesia-zirconia. Furthermore, cogels of silica-alumina, silica-zirconia and silica-alumina-zirconia may be employed. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the metal oxide content ranging from zero to 45 weight percent. Siliceous hydrogels utilized herein and hydrogels obtained therefrom may be prepared by any method well known in the art, such as for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and siliceous gel matrix may vary widely depending on the activity desired, with the crystalline aluminosilicate content ranging from about 2 to about 90 percent by weight and more usually from about 5 to about 80 percent by weight of the composite preferably from about 10 to about 50 percent by weight may be employed. While the above catalysts represent desired and preferred embodiments for use in the cracking process described herein, it is to be understood that other catalysts also may be employed which have the requisite activity to provide at least a 20 volume percent conversion of the hydrocarbon charge and which will be effective for accomplishing the desired hydrogen regeneration step.

Other catalysts which may be utilized herein are those composited either with or without one or more hydrogenation components combined to produce catalysts of a desired activity. The hydrogenating component of the catalyst which may be employed herein include metals, oxides and sulfides of metals which come within Group VI-A including chromium, molybdenum, tungsten and the like, and Group VIII or platinum type catalysts including cobalt, nickel, platinum, palladium, rhodium and the like and combinations of metals, sulfides and oxides of metals of Groups VI–A and VIII such as nickel-tungsten sulfide, cobalt oxide-molybdenum oxide cobalt molybdenum sulfide, nickel cobalt molybdenum oxide or sulfide and the like on a suitable carrier such as alumina or silica-alumina. The amount of hydrogenating components can be within the range of from about 0.1 to about 30 weight percent depending on the hydrogenation component employed.

Accordingly, the method and system of this invention contemplates the cracking of hydrocarbon feed material in the presence of a catalytically activated crystalline aluminosilicate either with or without the presence of at least one hydrogenating metal component and either with or without the presence of hydrogen-rich gas. Therefore, in a broad aspect, it may be said that the present invention contemplates passing catalyst sequentially and continuously through at least two hydrocarbon conversion zones wherein hydrocarbon conversion in the presence of hydrogen is accomplished in at least one of the zones.

Methods of preparing suitable catalysts which may be employed in the process of this invention are presented in the following examples.

Example I

A large batch, about 75 lbs. on dry basis (650° F.), of 13X wet cake to which was added 0.3 wt. percent "marspere" wetting agent was contacted semi-continuously in a 3-stage contactor with a combined solution of 5 wt. percent $RECl_3 \cdot 6H_2O$ and 2 wt. percent $NH_4Cl$ for 24 hours. RE means Rare Earth. This combined solution was charged at 1577 cc. solution per minute while the slurry was maintained at 180° F. during the exchange period. The slurry, containing 20 wt. percent solids, was filtered once every hour then reslurried for the semi-continuous exchanges. The exchanged X aluminosilicate was further washed clear of chloride ions at 180° F. then dried at 230° F. in air for 20 hours, followed by calcining in air for 10 hours at 1000° F. The very highly active catalytic material thus prepared may have its super cracking activity adjusted downward to a desired level by steaming, for example, for 24 hours at 1200° F. at 15 p.s.i.g. in a steam atmosphere, or it may be diluted by compositing with an amorphous silica-alumina hydrogel such as conventional catalytic material or with an inert material having no cracking activity. Methods for the adjustment of activity of such catalyst are discussed in application S.N. 208,512 filed July 9, 1962.

Example II

A platinum-zeolite 5A complex was prepared by adding a solution of platinum amine chloride to a solution of sodium aluminate, then admixing this with a solution of sodium metasilicate, the aluminum and silicon components being in proper proportions to produce a zeolitic product of the A pattern, and the total mixture refluxed at about 100° C. for about seven hours, the solid filtered out, washed, ion exchanged to substitute a substantial portion of calcium for the sodium, washed, dried, and calcined at temperatures high enough to assure that platinum is interspersed in the crystalline lattice of the zeolite. The platinum content was 0.31 percent by weight.

Separately, a sodium Y zeolite was treated at 180° F. by continuous contact with a 25 percent ammonium chloride solution at conditions such that 60 lbs. of this solution were contacted in the base exchange operation over a period of 48 hours. The zeolite was then water washed to chloride free, oven dried for 20 hours at 230° F., and calcined in air for 10 hours at 100° F. Proportions were such as to provide 500 ml. of finished catalyst. This provided an acid or H form of Y catalyst with approximately 99 percent of the original sodium replaced by hydrogen, as determined by analysis for residual sodium.

Equal amounts of the platinum 5A catalyst and the HY catalyst were ball milled together and pelleted.

Example III

A dehydrogenation component was prepared by impregnating Alcoa F–10 alumina, a commercial alumina, with a solution of chlorplatinic acid, drying and calcining to secure a catalyst with a platinum content of 1.3 wt. percent of Pt. A crystalline aluminosilicate, Line 10–X material, a commercially available material, was selected as the second component. 30 weight percent of the crystalline aluminosilicate 10–X component together with the platinum impregnated alumina were ball milled together and pelleted.

Example IV

An alumina-supported platinum catalyst was prepared by impregnating Alcoa F–10 alumina with chlorplatinic acid to yield a material of 0.3 weight percent of platinum after calcining and drying. This material was ball milled to a particle size of below approximately 5 microns. A chabazite zeolite material was base-exchanged with a concentrated solution of ammonium sulphide (50 gm. chabazite, 50 mil solution), for 16 hours, the solid separated and retreated (same conditions), for three more times, after which the solid was dried and calcined at 1000° F. for one hour to produce an acid-form or H-form chabazite. This material was also ball milled to a particle size of below approximately 5 microns. The platinum-bearing alumina and the H-chabazite were blended and ball-milled together to a uniform composite, which was pelleted to $\frac{1}{8}''$ by $\frac{1}{8}''$ pellets.

Having thus given a general descritpion of the improved method and means of this invention and presented examples of catalyst preparation which may be used therein, reference is now had to the drawings by way of example which diagrammatically present preferred embodiments thereof.

Referring now to FIGURE I by way of example, a high activity cracking catalyst described herein and fed to lift pot 4 is combined with a gaseous material, generally a relatively inert low moisture content gaseous material introduced to lift pot 4 by conduit 6 containing valve 8. Branch conduit 10 containing valve 12 is provided for introducing a controlled amount of the gaseous material in conduit 6 to conduit 2 either with or without a hydrocarbon feed such as a gas oil feed in conduit 2. The gaseous material substantially free of moisture in conduit 6 may be substantially any gaseous material such as light gaseous hydrocarbons available in the process and preferably hydrocarbons containing gases obtained from a low pressure phase separator step of the process. The gaseous material at a desired temperature is mixed with the catalyst to form a suspension thereof at a desired elevated cracking temperature which is then passed at a velocity sufficient to form a limited phase suspension passing upwardly through a riser reactor 14 into an enlarged separator or catalyst disengaging zone 16 wherein the limited phase suspension is caused to separate due to changes in direction of flow and velocity of the suspension. The hydrocarbon reactant to be converted or cracked may be introduced to the lower portion of the riser by conduit 2 admixed with gaseous material or through vertically spaced apart hydrocarbon reactant inlet A, B, C, associated with riser 14. By this arrangement of reactant inlets, the reactant contact time in the riser may be controlled over several different intervals of time and catalyst flow at a desired density and temperature can be established prior to combining the hydrocarbon feed therewith. A suitable deflector baffle represented by baffle 18 and positioned above the upper open end of the riser is employed to facilitate separation of catalyst particles from vaporous materials by changing the direction of flow of the suspension and this separation is further enhanced by causing a substantial reduction in velocity due to discharge into the enlarged separation zone 16. The vaporous reaction products are withdrawn from the upper portion of separation zone 16 by conduit 20. It is to be understood, although not shown, that a plurality of cyclone separators may be provided in the upper portion of the separation zone to assist in separation of catalyst particles from vaporous product material. Furthermore, the riser reactors may be advantageously connected directly to a cyclone separator to facilitate separation of catalyst particles from reactant product particularly when using a dilute phase riser reactor rather than indirectly connected to a cyclone separator system as shown most usually in the prior art.

The separated catalyst is collected beneath the riser outlet or discharge in a lower portion of the separation zone 16 as a bed of catalyst particles 22 maintained in a relatively dense fluid bed condition by the passage of hydrogen-rich gaseous material upwardly therethrough. In the lower portion of separator zone 16, the accumulated bed of catalyst is contacted with hydrogen-rich gas under fluidized hydrogenative conditions which strip hydrocarbonaceous material from the catalyst in conjunction with hydrogenating hydrocarbon components thereof to more useful product material. The hydrogenative step is enhanced by maintaining desired elevated temperature condition above about 900° F. with a portion of the heat requirement of this step being supplied when necessary by suitable indirect heat exchange means 24. Under some conditions of catalyst employed, it may be possible and necessary to employ temperatures below 800° F. or as high as 1500° F. Heat exchange means 24 may be an electrical coil or other suitable coil means through which a suitable heat exchange fluid may be passed.

The hydrogen-rich gas employed to accomplish the above described hydrogenative steps accomplished in the riser or fluid bed may supply a large portion of the heat required therein and the hydrogen-rich reactant gas may also be supplied to the system through a plurality of separate injection points as herein described. That is, a portion of the hydrogen-rich gas is passed into the lower portion of the separation zone by a distributor means supplied by conduit 26. The thus introduced hydrogen-rich gas passes upwardly through the bed of catalyst at a rate sufficient to maintain the catalyst in a fluidized condition and moving downwardly substantially countercurrent to the rising gaseous material. The thus treated catalyst is caused to move downwardly from the lower portion of the separation zone as a relatively compact fluid mass of catalyst particles into a relatively large standpipe and/or storage zone 28 extending downwardly from the separation zone. Additional hydrogen-rich gas is introduced to the lower portion of zone 28 by conduit 30 so that the catalyst in the standpipe will be maintained in an aerated condition by flow of the hydrogen-rich gases upwardly therethrough. By proper adjustment of conditions, standpipe and/or storage zone 28 may be employed to effect relatively severe hydrogen treatment of the catalyst and any hydrocarbonaceous material retained on the catalyst. Accordingly, zone 28 serves many purposes, the most important of which includes the hydrogenative regeneration of the catalyst to remove adsorbed hydrocarbonaceous material from the catalyst.

In the arrangement of FIGURE I, the catalyst in standpipe zone 28 is shown being discharged into a surge zone 32 which is particularly desirable when employing relatively coarse catalyst particles as distinguished from particles of a size less than 100 microns. When employing surge pot 32, a hydrogen containing pressuring gas is introduced thereto by conduit 34 in an amount and at a pressure sufficient to effect desired purging of the catalyst. Generally, conduit 36 will be of a considerably smaller diameter than chamber or standpipe 28.

Referring now to FIGURE II by way of example, an embodiment of FIGURE I is diagrammatically presented wherein all of the hydrogen treated catalyst is passed to an oxygen regeneration zone before recycling the catalyst to the riser reactor inlet. In the system of FIGURE II a hydrocarbon feed in conduit 42 is mixed with catalyst and a gaseous lift material introduced by conduit 44 to lift pot 46. Valve 48 provided in conduit 44 provides means for adjusting the amount of gaseous material passed to the upper portion of lift pot 46 and above a mass of catalyst maintained therein and branched conduit 50 provided with valve 52 provides means for mixing a desired quantity of gaseous material with the hydrocarbon feed introduced by conduit 42. The thus formed mixture is passed upwardly through riser reactor 54 in a relatively dilute phase condition at an elevated cracking temperature sufficient to effect at least partial cracking of the hydrocarbon feed. The suspension in riser 54 is discharged into and separated in separation zone 56 in a manner similar to that described with respect to FIGURE I. Baffle 58 functions in a manner similar to that described with respect to baffle 19 of FIGURE I. The separated catalyst is collected in the lower portion of separation zone 56 as a mass of catalyst particles 60 maintained in a fluid condition by the passage of hydrogen containing gaseous material upwardly therethrough. The hydrogen containing gases are introduced to the lower portion of the dense fluid bed 60 by a distributor manifold means connected to conduit 62 and in an amount and under conditions to effect hydrogenative treatment of the catalyst. The thus treated catalyst containing incompletely removed carbonaceous material is passed in this embodiment to an oxygen regeneration zone 64 by seal leg conduit 66. Conduit 68 is provided for introducing a suitable seal gas such as low oxygen content flue gas to seal leg conduit 66.

In zone 64, the catalyst 70 maintained in a dense fluid bed condition or as a dense moving bed depending upon the size of the catalyst particles employed in the process is contacted with an oxygen containing gaseous material introduced thereto through a suitable distributor manifold or means connected with conduit 72. The catalyst mass 70 in regeneration zone 64 is subjected to elevated temperature oxygen regeneration conditions sufficient to remove carbonaceous material from the catalyst by burning with the combustion products thereof being removed therefrom by conduit 76. The oxygen regenerated catalyst is removed from the lower portion of zone 64 and passed by a suitable seal leg conduit 78 to seal pot 80 wherein the atmosphere of the catalyst is made suitable for passage to lift pot 46 by conduit 82. Conduit 84 is provided for adding a suitable seal gas to seal leg 78 and conduit 86 is provided for adding a suitable purge gaseous material to the lower portion of zone 80 for adjusting the atmosphere of the catalyst before recycling to the riser reactor lift pot 46. Conduit 88 is provided for removing purge gas from purge or seal zone 80.

FIGURE III differs from the arrangements presented in FIGURES I and II by placing the oxygen regeneration step of the catalyst in parallel catalyst flow arrangement with the hydrogen treating step. That is, FIGURE III presents diagrammatically in elevation an embodiment of this invention wherein only a portion of the catalyst circulating in the system is subjected to oxygen regeneration treatment to remove carbonaceous material from the catalyst. In the system of FIGURE III, a hydrocarbon feed material such as a gas oil to be cracked to higher and lower boiling range materials including gasoline is introduced by conduit 90 to a lift pot 92 containing catalyst wherein mixing of the oil and catalyst is initial in the presence of gaseous material introduced to the process by conduit 94 containing valve 96 and conduit 98 containing valve 100. The thus formed mixture at an elevated cracking temperature is passed as a relatively dilute catalyst suspension upwardly through riser reactor 102 under cracking conditions sufficient to effect at least partial conversion of the hydrocarbon feed. The suspension in riser 102 is discharged into the upper portion of separation zone 104 and above a relatively dense fluid mass of separated catalyst particles lying in the lower portion of the seperation zone. Baffle 108 positioned above the upper open end of riser 102 assists in the separation of the suspension discharged from the riser as specifically discussed with respect to FIGURE I. Vaporous conversion products are removed from the upper portion of separator 104 by conduit 110. The catalyst mass 106 is maintained in a fluidized condition by hydrogen-rich gaseous material introduced to the lower portion thereof by distributor manifolds or means supplied by conduits 112 and 114.

In the system of FIGURE III, a portion of the catalyst 106 collected in the separation zone is withdrawn therefrom either continuously or intermittently after being stripped with a suitable inert gaseous material introduced by conduit 114 to a distributor manifold associated therewith. The catalyst thus stripped is withdrawn for passage through a seal by 116 provided with valve 118 into an oxygen regeneration zone 120. In regeneration zone 120, the catalyst is contacted with an oxygen containing gas introduced thereto by conduit 122 attached to a suitable distributor means to remove carbonaceous material from the catalyst by burning thereby heating the catalyst to an elevated temperature of at least about 1000° F. In the arrangement of FIGURE III, the catalyst is regenerated in a moving bed condition moving countercurrent to rising regenerating gaseous material with the gaseous products of the regeneration step being withdrawn from the upper portion thereof by conduit 124. It is to be understood, however, that the possibility is contemplated of employing a fluid catalyst bed regeneration step in zone 120 as well as in bed 106 and this possibility will be governed in part by the catalyst particle size employed in the system. The regenerated catalyst is withdrawn from the lower portion of the regeneration zone as shown in FIGURE IIII and purged with a suitable inert gaseous material so that the hot regenerated catalyst may be passed to the lift pot zone 92 by a conduit 128 provided with a flow control valve 130 and mixed with hydrogen regenerated catalyst treated in regeneration bed 106. The hydrogen treated catalyst in bed 106 is passed from the lower portion thereof by seal leg 132 to a suitable seal pot 134 and thence to lift pot 92 by seal leg 136. Suitable seal gas is introduced to seal pot 134 by conduit 138. The system of FIGURE III is substantially identical with that described with respect to FIGURE I and differs therefrom in providing means for effecting oxygen regeneration of a portion of the catalyst circulated in the system. In some applications, the system of FIGURE III whether a fluid or moving bed operation is preferred over the systems of FIGURE I and II. In addition to the above, it is to be understood that the catalyst passed to the oxygen regeneration step of the process may be a portion of the catalyst withdrawn by standpipe 132 from the bottom of bed 106 rather than being withdrawn from the upper portion of the bed as shown. In this arrangement, it is contemplated passing a portion of the catalyst withdrawn from the bottom of catalyst bed 106 as a suspension upwardly into a fluid catalyst regeneration zone and returning the thus oxygen regenerated catalyst to the system at the seal pot 134 or adjacent thereto.

FIGURE IV presents diagrammatically a ctalyst system and arrangement of apparatus encompassing referred to embodiments of this invention, utilizing more than one, for example, two or more dilute phase catalyst reaction zones to which the catalyst particles are supplied from a common supply zone 140. More specifically, a catalyst accumulation or supply zone 140 supplied with purge gas by conduit 142 and containing a bed of catalyst particles suitable for use in a moving bed system is provided adjacent the inlet to dilute phase reactors 144 and 146. Catalyst particles are supplied to the lower portion of riser 144 by a standpipe of seal leg 148 provided with a suitable solids flow control, such as control valve 150. Similarly, catalyst particles are supplied to the lower portion of riser 146 by a standpipe or seal leg 152 provided with a suitable solids flow control means, such as valve 154. Hydrocarbon feed materials to be converted in the reactors 144 and 146 are introduced to the lower portion thereof by conduit 156 and 158 with conduit 160 supplying conduits 162 and 164 with a diluent gas which may or may not be an inert gas for introduction with the hydrocarbon in the riser reactors. In the lower portion of the reactors (144 and 146), the hydrocarbon reactant with or without a suitable diluent material is mixed with the high activity catalyst particles for passage as a suspension under desired elevated temperature cracking conditions and space velocity upwardly through the reactors for discharge into the upper portion of an enlarged separation zone 166 preferably above a bed of separated catalyst particles 168 accumulated therein. Deflector baffle 170 and 172 positioned above the open discharge end of the riser reactors aids in the separation of the suspended catalyst from the vaporous material therewith, in a manner similar to that described with respect to FIGURE I. The separation of catalyst particles from vaporous material may be assisted with suitable cyclone separator equipment not shown. Vaporous material is removed from the upper portion of separation zone 166 by conduit 174. The separated catalyst accumulated as a bed of catalyst 168 is accompanied by adsorbed hydrocarbonaceous deposit and hydrocarbonaceous material entrained with the catalyst discharged from the riser reactors. In accordance with the method of this invention, the mass of catalyst in bed 168 is contacted with a hydrogen-rich gas under hydrogenative conditions sufficiently severe to remove hydrocarbonaceous material from the catalyst and hydrogenate components thereof. Accordingly, the hydrogen contacting step being effected in the bed of catalyst 168 is of a severity sufficient to remove a substantial portion of deposited hydrocarbonaceous material from the catalyst by hydrogen-rich gas introduced to the lower portion of the bed by a distributor means supplied by conduit 176. Accordingly, the bed of catalyst 168 moves generally downwardly through the contact zone countercurrent to rising hydrogen-rich gas. Vaporous material recovered from the catalyst is combined with the vaporous products of the riser reactors for removal from the separation zone 166 by conduit 174. The hydrogen regenerated catalyst is passed from the bottom of bed 168 by a suitable standpipe 178 into accumulation zone 140 for reuse in the process. Standpipe 178 extends downwardly into zone 140 a sufficient distance to provide a free space above the catalyst surface for introducing purge gas or alternately the gas would be introduced directly into a standpipe which would replace zone 140 shown.

In the system of FIGURE IV, the hydrogen treating step effected in zone 166 may be carried out at temperatures equal to or above the cracking temperatures employed in the riser reactors 144 and 146 and the elevated temperatures may be obtained by providing suitable indirect heat exchange coils not shown within the bed of catalyst 168 for supplying heat in addition to that supplied with the hydrogen-rich gas stream.

Having thus provided a general description of the improved method and means of this invention and provided specific examples thereof, it is to be understood that no undue restrictions are to be imposed by reasons thereof.

I claim:

1. A method which comprises contacting a hydrocarbon reactant with a crystalline aluminosilicate-containing catalyst under cracking conditions in a first cracking zone wherein the catalyst moves as a relatively dilute suspension, said cracking conditions being such as to limit the deposition of carbonaceous deposits on said catalyst particles, separating products of cracking from catalyst particle material, passing a portion of separated catalyst particle material containing deposited carbonaceous material as a downwardly moving fluidized dense bed through a carbonaceous material removing zone adjacent to said first zone countercurrent to hydrogen-rich gas under conditions to react with and remove said deposited carbonaceous material from said catalyst particles, passing the remaining portion of separated catalyst particle material containing deposited carbonaceous material to contact with oxygen-containing gas is a regeneration zone, combining the resulting two portions of regenerated catalyst and passing the combined catalyst streams to said first cracking zone.

2. The method of claim 1 in which the contact with the hydrogen-rich gas takes place at a pressure in excess of about 500 p.s.i.g.

3. The method of claim 2 in which the said catalyst particle material containing deposited carbonaceous material is pressured in a pressure-building lock-hopper zone before hydrogenation.

4. The method of claim 2 in which the catalyst contains a hydrogenation-promoting metal component.

5. The method of claim 2 in which hydrogenation takes place at a temperature above about 900° F.

6. The method of claim 5 in which hydrogenation takes place at a temperature of about 1000° F. to 1400° F.

7. The method of claim 2 in which hydrogenation takes place in a dense bed, fluidized with hydrogen-rich gas, adjacent said first cracking zone.

8. The method of claim 7 wherein a plurality of confined first cracking zones are arranged external to said hydrogenation zone.

9. The method of claim 7 wherein a plurality of confined first cracking zones are contained within said hydrogenation zone.

References Cited

UNITED STATES PATENTS

| | | | |
|---|---|---|---|
| 3,236,761 | 2/1966 | Rabo et al. | 208—111 |
| 2,389,236 | 11/1945 | Payne | 208—153 |
| 2,396,109 | 3/1946 | Martin | 208—153 |
| 2,422,262 | 6/1947 | Russell | 208—150 |
| 2,765,265 | 10/1956 | Bourguet et al. | 208—174 |
| 2,767,127 | 10/1956 | Guala | 208—174 |
| 3,188,184 | 6/1965 | Rice et al. | 208—164 |
| 3,248,319 | 4/1966 | Bowles et al. | 208—163 |
| 3,132,091 | 5/1964 | Young | 252—411 |
| 3,197,399 | 7/1965 | Wight et al. | 252—411 |
| 3,238,120 | 3/1966 | Sale | 208—111 |
| 3,248,319 | 4/1966 | Bowles et al. | 208—163 |

DELBERT E. GANTZ, *Primary Examiner.*

HERBERT LEVINE, *Assistant Examiner.*